Dec. 21, 1948.    A. VALENTIN    2,457,014
DYNAMOELECTRIC MACHINE
Filed April 9, 1947
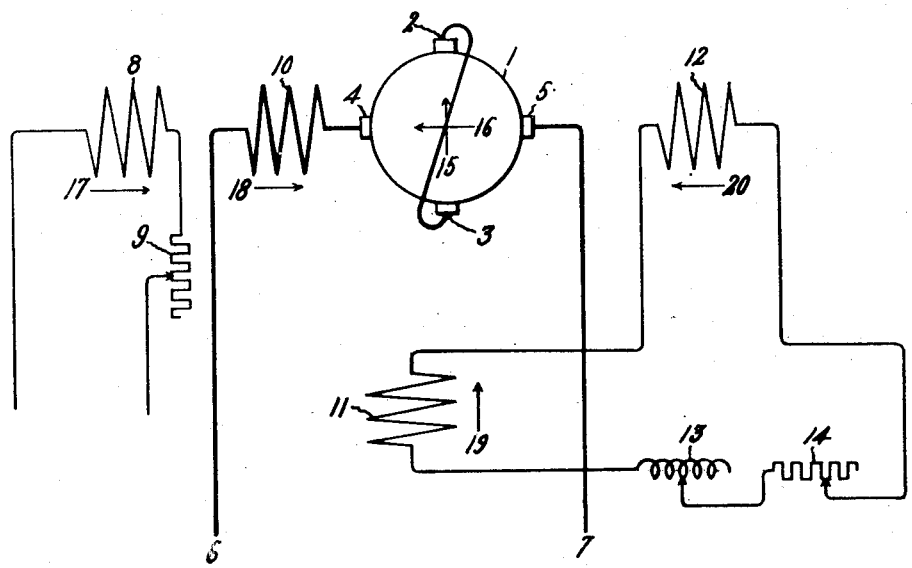
Inventor:
Andre Valentin,
by *Bravell P. Mack*
His Attorney.

Patented Dec. 21, 1948

2,457,014

UNITED STATES PATENT OFFICE 2,457,014

DYNAMOELECTRIC MACHINE

André Valentin, Belfort, France, assignor to General Electric Company, a corporation of New York Application April 9, 1947, Serial No. 740,410 In France April 12, 1943

Section 1, Public Law 690, August 8, 1946 Patent expires April 12, 1963

5 Claims. (Cl. 322—19)

My invention relates to improvements in dynamoelectric machines of the armature reaction type. More specifically, my invention relates to a stabilizing or antihunting means for dynamoelectric machines of the type excited by armature reaction flux created by current circulating between primary or short circuiting brushes and having means for variably neutralizing armature reaction flux produced by current circulating between secondary or utilization brushes which are displaced peripherally from said primary brushes.

Machines of this type act as amplifier dynamos and have been given the name "amplidynes." It is known that under some conditions such machines tend to oscillate, hunt, or pump and that the higher the sensitivity of the amplidyne the more pronounced is this tendency to be unstable.

It is an object of my invention to provide simple and inexpensive means for overcoming this difficulty.

Broadly speaking, the means employed in this connection comprises a separate electrical circuit including an additional field winding which acts as an inductor winding and which is effectively in circuit with another winding, said latter winding acting in the axis of the utilization circuit brushes. The arrangement of these windings is such that when a variation in excitation is produced by some change in a separate controlling means, a momentary electromotive force is induced in the inductor winding. This causes a current to flow in the other winding, creating in the latter winding ampere turns that momentarily reduce the flux variation caused by the change in the controlling means. Thus, this separate electrical circuit damps out oscillations and acts as an antihunt device. Other aspects of the invention will appear from consideration of the following description taken in connection with the accompanying drawing.

In the drawing, I have represented schematically an embodiment of my invention applied to an amplidyne generator having a rotatable member or armature 1 with a commutator connected to an armature winding of the conventional direct-current type and adapted to be driven at substantially constant speed by any suitable source of mechanical power. For illustrative purposes the machine is assumed to have poles 90 electrical degrees apart. With this type excitation system, the armature is provided with a set of primary commutating brushes 2 and 3 which provide a primary circuit through armature 1 and a set of secondary commutating brushes 4 and 5 displaced 90 electrical degrees from the primary brushes 2 and 3. Primary brushes 2 and 3 are externally connected to provide a substantially short circuited circuit, while secondary brushes 4 and 5 provide a secondary or utilization circuit through the armature. This secondary circuit is connected through leads 6 and 7 to a load such as the field winding of a separate direct current motor (not shown).

In order to control the secondary characteristics or output of the amplidyne generator, there is provided a regulating means which includes a control field exciting winding 8 arranged to provide a component of magnetic excitation along the secondary brush axis. Any suitable means, such as the variable resistance 9, may be used to vary the energization of this control field winding. If desired, the sensitivity of control field 8 may be increased by providing a compensating field winding 10 arranged to provide a component of magnetic excitation along the secondary brush axis substantially neutralizing armature reaction flux caused by current flowing in armature conductors in the secondary circuit. Thus far, the arrangement is purely conventional.

The features of novelty which characterize my invention include the additional windings 11 and 12. In the embodiment illustrated, winding 11 is arranged just as though it were to be effective in producing a component of magnetic excitation along the axis of the primary brushes 2 and 3, and winding 12 is arranged to provide a component of magnetic excitation along the axis of the secondary brushes 4 and 5. Windings 11 and 12 are electrically closed one upon the other. It is advantageous to make this electrical circuit adjustable by means of an adjustable impedance which in the embodiment illustrated comprises the adjustable inductance 13 and the likewise adjustable resistance 14 connected in series in said circuit.

Since primary brushes 2 and 3 are short circuited, only a small amount of flux is required to induce a voltage between said brushes sufficient to cause relatively large primary current to flow through that part of the armature winding connected between them. This primary current produces, along the primary axis, a primary armature reaction flux which is indicated by arrow 15. As armature 1 rotates, the armature conductors connected to secondary brushes 4 and 5 cut this primary armature reaction flux. This induces a voltage between brushes 4 and 5, and current flows through the secondary circuit when closed. This current produces a secondary armature reaction flux, represented by the arrow 16, along the axis of secondary brushes 4 and 5. Conventionally, control field 8 and compensating winding 10 are so arranged that each provides a component of magnetic excitation along the axis of secondary brushes 4 and 5 in opposition to the secondary armature reaction 16. In the drawing, arrow 17 indicates the component of magnetic excitation normally produced by control field 8, and arrow 18 indicates the component of magnetic excitation produced by compensating winding 10 under load conditions.

Additional winding 11 acts as an inductor or take-off winding, and is so arranged that when the current suddenly increases in the control field winding 8, causing an increase in flux in the direction, say, of arrow 17, with a resultant change in primary armature reaction flux 15, a momentary electromotive force or voltage is induced in winding 11. Windings 11 and 12 are so arranged and connected that this transient voltage causes a transient current to flow in windings 11 and 12 in such a direction that the flux or component of magnetic excitation caused by the ampere turns of winding 12 is opposed to the flux increase of control winding 9. The flux caused by the ampere turns of winding 11 is relatively immaterial but, for the sake of clarity, is indicated in the drawing by arrow 19. Arrow 20 indicates the direction of the flux caused by the ampere turns of winding 12, said flux being in opposition to the control field flux increase assumed to be represented by arrow 17, as explained above.

Conversely, when the flux produced by control winding 8 suddenly decreases, a transient current is caused to flow in windings 11 and 12 in such a direction that flux created by the ampere turns of winding 12 is opposed to the flux decrease caused by the current change in control winding 8, and a damping action is again produced.

The application of current to winding 12 may be speeded or retarded by changing its phase relationship with respect to the voltage induced in winding 11 through regulation of a variable reactance, such as variable inductance 13. The value of the current which flows through winding 12 may be changed by regulating the variable resistance 14. Thus, both the speed and the amplitude of the damping action may be controlled. If the amplidyne supplies, through the leads 6 and 7, a circuit with a low time constant, it will be necessary, in order to avoid oscillations and hunting in the regulation insured by the machine, to have a fast damping action. To this end, it may be advisable to suppress or eliminate the inductance 13 and impart to resistance 14 a value which will suffice for the realization of such rapid damping. If, on the other hand, the amplidyne energizes a circuit which is fairly inductive, it may be advantageous to defer the damping action until the response to a control change is almost complete. To this end, it may be advisable to reduce or eliminate resistance 14 and impart to inductance 13 a value sufficiently high so that the damping action will manifest itself only with the desirable time lag.

The dimensions of inductance 13 and resistance 14 depend directly on the power to be dissipated in winding 12. Because the secondary armature flux 16 and the flux produced by compensating winding 18 counterbalance each other, or nearly so, winding 12, like control winding 8, has a very low power consumption. Therefore, and because the amplidyne is essentially an amplifier, it is possible to meet all oscillation damping requirements by influencing through variable taps apparatus such as inductance 13 and resistance 14 which may be of small size and calculated for low current densities.

There is thus provided a device of the character described which is capable of meeting the objects hereinabove set forth and of acting as a shock absorber to damp out oscillations whether of large or small value.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. In a dynamoelectric machine of the armature reaction type, an armature provided with a commutator and a winding attached thereto, a set of primary brushes for providing a primary circuit through said armature winding, a set of secondary brushes for providing a secondary circuit through said armature winding, a control field winding arranged to provide a component of magnetic excitation along the axis of said secondary brushes, means for varying the energization of said control field winding, a compensating winding arranged to provide a component of magnetic excitation along the axis of said secondary brushes, a third field winding, said third winding being arranged to have induced therein a momentary electromotive force in response to sudden change in the energization of said control field winding, a fourth field winding, said fourth field winding being arranged to provide a component of magnetic excitation along said secondary brush axis, means for electrically interconnecting said third field winding and said fourth field winding so that a transient electromotive force induced in said third winding will cause in said fourth winding ampere turns which produce a momentary component of magnetic excitation substantially opposing change in control field energization, and means for modifying the amount and phase relationship of the transient current in said fourth winding with respect to the transient electromotive force induced in said third winding whereby an adjustable damping action is provided to prevent oscillations and hunting of said machine.

2. A dynamoelectric machine of the amplidyne type having an armature with a commutator, a winding attached to said commutator, a set of primary commutating brushes for providing a primary circuit through said armature, means for electrically connecting together said primary brushes to complete said primary circuit, a set of secondary commutating brushes for providing a secondary circuit through said armature, means for electrically connecting said secondary brushes to an external circuit, means including a compensating winding for producing a component of magnetic excitation along the axis of said secondary brushes and substantially neutralizing the armature reaction flux produced by current flowing in the secondary circuit between said brushes, regulating means including a control field winding for variably influencing the total component of magnetic excitation along the axis of said secondary brushes, an inductor winding adapted to having induced therein a transient current responsive to sudden variation in the influence of said regulating means, a field winding electrically interconnected with said inductor winding and arranged to provide along the axis of said secondary brushes a momentary component of magnetic excitation opposing said sudden variation in the influence of said regulating means whereby said machine is provided with an oscillation damping and antihunt device.

3. In a dynamoelectric machine of the amplidyne type, an armature with a commutator thereon and a winding attached to said commutator, a set of primary brushes arranged to provide a substantially short circuiting circuit through said armature, a set of secondary brushes substantially displaced about the periphery of said commutator from said primary brushes and arranged to provide a secondary circuit through said armature, conventional field exciting windings including a control field winding, means including two additional windings for opposing sudden change in control field flux, one of said additional windings acting as an inductor winding adapted to having a transient electromotive force induced therein by a change in control field energization, and the other of said additional windings being electrically interconnected with said inductor winding and arranged to provide a transient component of magnetic excitation momentarily opposing change in the component of magnetic excitation supplied by said control field.

4. In a dynamoelectric machine of the armature reaction type, an armature including a commutator and a winding attached to said commutator, a set of primary brushes in contact with said commutator and electrically interconnected to form a substantially short circuited circuit through said armature, a set of secondary brushes in contact with said commutator, the axis of said set of secondary brushes being substantially displaced from the axis of said set of primary brushes, means for connecting said secondary brushes to an external utilization circuit, means including a compensating winding for opposing armature reaction caused by utilization current between said secondary brushes, an excitation control field winding arranged to produce a component of magnetic excitation along the axis of said set of secondary brushes, means for varying the energization of said control field winding, and an additional circuit comprising two additional windings, one of said windings acting as an inductor winding adapted to have a transient voltage induced therein by variation of the energization of said control field winding, and the other of said windings electrically interconnected to said inductor winding and arranged to produce a momentary component of magnetic excitation along the secondary brush axis opposing change in the component of magnetic excitation caused by said control field winding, said additional control circuit also including an adjustable resistance and an adjustable reactance whereby oscillations and hunting may be adjustably eliminated from the operation of said machine.

5. In a dynamoelectric machine of the armature reaction excited type, an armature having an armature winding and a commutator, a set of primary brushes, means for substantially short circuiting said primary brushes, a set of secondary brushes substantially displaced about the periphery of said commutator from said set of primary brushes, means for connecting said secondary brushes to an external circuit, a control field exciting winding arranged to provide a component of magnetic excitation along the axis of said set of secondary brushes, means for varying the energization of said control field exciting winding, a compensating winding for substantially neutralizing armature reaction caused by current flowing in the armature winding between said secondary brushes, a third field winding physically arranged as though it were to provide a component of magnetic excitation along the axis of said set of primary brushes, a fourth field winding arranged to provide a component of magnetic excitation along the axis of said set of secondary brushes, means for electrically interconnecting said third field winding and said fourth field winding so that voltage induced in said third winding will cause current to flow in said fourth winding, and means for controlling the amount and time lag of said current supplied to said fourth winding with respect to said voltage induced in said third winding whereby the operating stability of said dynamoelectric machine may be increased.

ANDRÉ VALENTIN.

REFERENCES CITED

The following references are of record in the file of this patent:

UNITED STATES PATENTS

| Number | Name | Date |
|---|---|---|
| 2,247,166 | Edwards et al. | June 24, 1941 |
| 2,349,308 | Rhyne | May 23, 1944 |